(12) United States Patent
Agbay (10) Patent No.: US 7,870,867 B2
(45) Date of Patent: Jan. 18, 2011

(54) CURB BOX LOCK

(75) Inventor: Anthony John Agbay, Spencer, MA (US)

(73) Assignee: Inner-Tite Corp., Holden, MA (US)

( * ) Notice: Subject to any disclaimer, the term of this patent is extended or adjusted under 35 U.S.C. 154(b) by 112 days.

(21) Appl. No.: 12/233,775

(22) Filed: Sep. 19, 2008

(65) Prior Publication Data

US 2009/0071205 A1    Mar. 19, 2009

Related U.S. Application Data

(60) Provisional application No. 60/973,618, filed on Sep. 19, 2007.

(51) Int. Cl.
*F16L 5/00* (2006.01)
(52) U.S. Cl. .................. 137/364; 137/371; 137/382; 137/385; 404/25
(58) Field of Classification Search .................. 137/327, 137/364, 371, 382, 385; 70/169; 404/25
See application file for complete search history.

(56) References Cited

U.S. PATENT DOCUMENTS

| 1,229,429 | A | * | 6/1917 | Farley | .................. 137/371 |
|---|---|---|---|---|---|
| 2,373,470 | A | * | 4/1945 | Hanke | .................. 70/168 |
| 3,227,183 | A | * | 1/1966 | Hecht | .................. 138/89 |
| 3,797,286 | A | * | 3/1974 | Saporito | .................. 70/169 |
| 4,556,081 | A | * | 12/1985 | Gagas | .................. 137/366 |
| 4,577,478 | A | * | 3/1986 | Economopoulos et al. | .... 70/168 |
| 4,902,165 | A | * | 2/1990 | Embree | .................. 404/25 |
| 5,871,030 | A |   | 2/1999 | Agbay |   |
| 5,871,031 | A | * | 2/1999 | Greinacher | ............ 137/599.08 |
| 5,987,824 | A | * | 11/1999 | Fuller | .................. 52/19 |

OTHER PUBLICATIONS

AMPro Valve Box Locks and Plugs, web page.
The PLUG Curb Box Lock, web page.

* cited by examiner

*Primary Examiner*—Stephen Hepperle
*Assistant Examiner*—Macade Brown (57) ABSTRACT

A curb box lock that includes a body portion and a plurality of slidably extendable claws within the body portion. The claws being extendable from the body portion to selectively engage side walls of a curb box. The lock also includes an adjustment mechanism operatively connected to the claws and the body portion. The adjustment mechanism selectively extends the claws such that the claws can be maintained in engagement with the side walls at all times when the lock is deployed within a curb box to prevent removal of the lock.

11 Claims, 15 Drawing Sheets

CURB BOX LOCK

CROSS-REFERENCE TO RELATED APPLICATION

This application claims priority from U.S. Provisional Application No. 60/973,618, filed Sep. 19, 2007, titled "CURB BOX LOCK," which is hereby incorporated by reference in its entirety.

FIELD OF THE INVENTION

This invention relates, in general, to a locking device for a curb box, and deals more particularly with an improved locking device that when in use features permanently deployed claws for preventing unauthorized access to a utility valve situated at the bottom of a curb box.

BACKGROUND OF THE INVENTION

Curb boxes are covered boxes that are conventionally located at ground level and extend downward to an underground bottom portion. Generally, utility valves, such as a natural gas valves and the like, are situated at the bottom of the curb boxes. As will be appreciated, the valves are used to start or stop delivery of a utility to a structure. To prevent unauthorized access to such valves, locks are often employed. Known locks, such as those described in U.S. Pat. No. 5,871,030, are placed into an uncovered curb box directly above the valve. Such locks employ, among other components, a body, a cone-shaped tip, a shaft with a terminal foot, an upper collar, and claws which extend and grab an interior surface of the curb box upon an unauthorized removal attempt.

With known locks, however, the claws are typically deployed with force only when one attempts to remove the lock by pulling upward on the upper collar. Upward movement of the collar relative to the body causes the claws to cam outward to forcefully engage the box interior. Conversely, authorized removal is accomplished through a specialized tool with an internal recess configured to receive the cone-shaped tip. The lock is then extracted from the box via engagement of the tool and the tip.

While the above-described locks are quite effective in securing curb boxes, it is desirable to have a curb box lock that includes the additional security of permanently deployed claws which engage an inner surface of a box with significant force, at all times when the lock is in use, to thwart removal from relatively shallow and wide curb boxes. Moreover, it is desirable to have a curb box lock with fewer components providing ease of manufacture.

With the forgoing concerns in mind, it is the general object of the present invention to provide an improved curb box lock with fewer structural components and improved security features for boxes of relatively shallow depth and substantial width. In particular, it is the general object of the present invention to provide a simplified curb box lock that includes claws which can be selectively activated via a specialized tool upon placement of the lock in the box to permanently engage a box interior while in use thereby preventing removal.

SUMMARY OF THE INVENTION

It is an object of the present invention to provide a curb box lock.

It is another object of the present invention to provide an improved curb box lock that allows for ease of manufacture and reduces associated costs.

It is an additional object of the present invention to provide an improved curb box lock that allows for ease of manufacture and a decrease in associated costs through a reduction in the number of structural components of the lock.

It is yet another object of the present invention to provide an improved curb box lock that includes an additional security measure to thwart removal of the lock from curb boxes of relatively shallow depth and large width.

It is a further object of the present invention to provide an improved curb box lock that prevents removal of the lock from a box of relatively shallow depth through claws that are deployed with significant force the entire duration that the lock is in the box regardless of whether an unauthorized removal is attempted.

An embodiment of the present invention is a curb box lock that includes a body portion, a plurality of slidably extendable claws within the body portion. The claws being extendable from the body portion to selectively engage side walls of a curb box. The lock also includes an adjustment mechanism operatively connected to the claws and the body portion. The adjustment mechanism selectively extends the claws such that the claws can be maintained in engagement with the side walls at all times when the lock is deployed within a curb box to prevent removal of the lock.

An embodiment of the present invention also includes tool for installing and removing a curb box lock said lock having a plurality of slidably extendable claws, the claws being selectively extendable upon rotation of a threaded rod to fixedly and forcably engage side walls of a curb box such that the claws may remain extended an entire time the lock is in the curb box to thwart removal of the lock. The tool includes a shaft having a first end and an opposing second end, an engagement portion at the first end. The engagement portion may be operatively secured to the threaded rod. The tool also includes a handle portion at the second end, wherein when the handle portion is rotated, the engagement portion rotates so that the claws may be both extended to fixedly engage side walls to install the lock or retracted to remove the lock from the curb box.

These and other objectives of the present invention, and their preferred embodiments, shall become clear by consideration of the specification, claims and drawings taken as a whole.

BRIEF DESCRIPTION OF THE DRAWINGS

FIGS. 12A-15B are additional detailed plan view of various subcomponents of the curb box lock of FIG. 2 and removal tool of FIG. 8.

DETAILED DESCRIPTION OF THE PREFERRED EMBODIMENT

Figure 1:
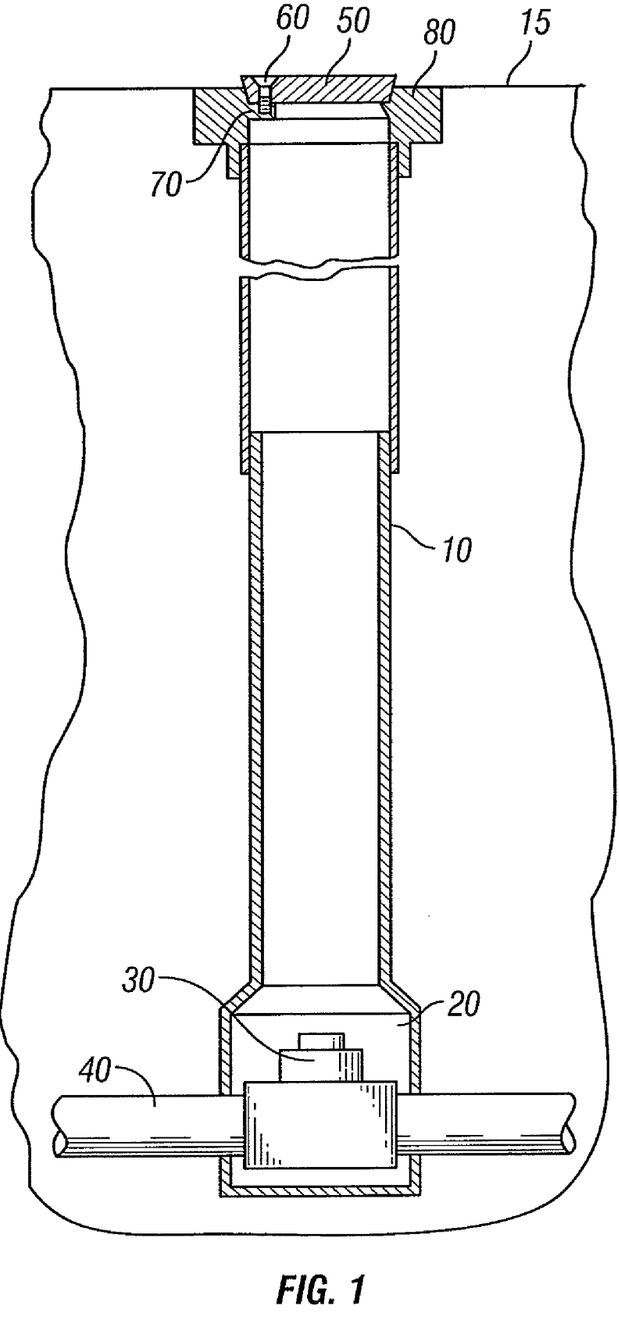
FIG. 1 is a cutaway view of a known curb box illustrating a utility conduit and valve.

Referring to FIG. 1, known curb boxes 10 extend downward from ground level 15 to a terminal bottom portion 20. The boxes 10 are tubular in shape. Typically, valves 30 of a utility conduit 40 such as a natural gas or water pipe are located at the bottom portion 20 of such curb boxes 10. A removable cap 50 closes off the top of the curb box 10. The cap 50 is typically secured in place by a screw 60 threaded into an underlying radially-protruding boss 70 on a collar 80 at the top of the box 10. As will be appreciated, curb boxes can have varying depths and diameters. Depths of such boxes typically range from just over a foot to about seven feet. Diameters of boxes range from about two inches to over four inches depending on the particular utility and municipality.

Figure 2:
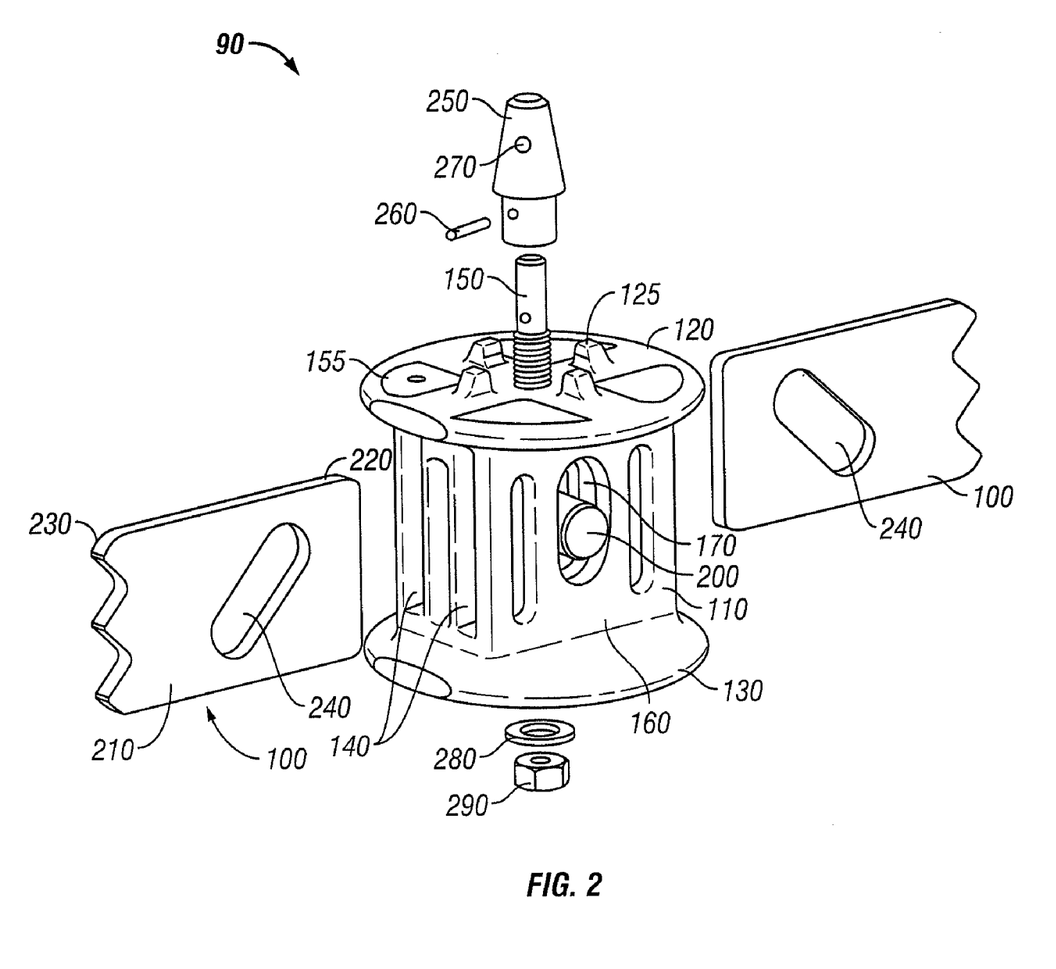
FIG. 2 is an exploded perspective view of a preferred embodiment of a curb box lock of the present invention illustrating the constituent components thereof.

Referring now to FIG. 2, a curb box lock in accordance with an embodiment of the present invention is generally depicted at 90. In use, the lock 90 is lowered into the tubular curb box 10 utilizing a specialized tool (FIG. 8) to prevent access to the valve 30. Upon lowering the lock 90 into the box 10, the lock 90 is secured within the box 90 by slidably extendable claws 100 on either side of the lock 90.

The lock 90 includes a body portion 110 with an upper collar 120 and a lower collar 130. The body portion 110 has an open interior cavity. The collars 120, 130 are sized to fit closely within the tubular lock box 10 (FIG. 1) and, therefore, have a circumference slightly smaller than that of the box in which the lock 90 is to be deployed. As shown, the body portion 110 has two rectangular side openings 140 on its side surfaces. The side openings 140 receive the claws 100, which slide in and out of the openings 140, and into or out of the open body interior cavity, when secured in or removed from a box 10.

The lock 90 further includes a threaded rod or screw 150, which extends through a bore or aperture 152 in a top surface 155 of the body portion 110 (FIG. 6A) and out of a corresponding aperture in a bottom surface (not shown) of the body 110. The body portion 110 also includes a front 160 and a back surface (not shown). Both the front 160 and back surfaces include a longitudinally extending aperture or slot 170. The slots 170 are open to the interior of the body and are sized and shaped to accommodate a cam shaft 200. More specifically, the slots 170 guide and limit travel of the cam shaft 200, as described in greater detail below. The slots 170 are hereinafter referred to as "cam slots."

The claws 100 include a substantially rectangular claw body 210 with a first end 220 and a second end 230 having a jagged or serrated surface configured to engage an interior wall of a curb box. Each claw 100 further includes a diagonally extending claw slot 240. When assembled, the claws 100 both reside in the open interior of the body portion 110 and the cam shaft 200 protrudes through the claw slots 240 thereby preventing them from falling out of the body portion 110. The serrated end 230 of each claw 100 protrudes from opposite sides of the body portion 110 through opposing side openings 140.

Figure 3A:
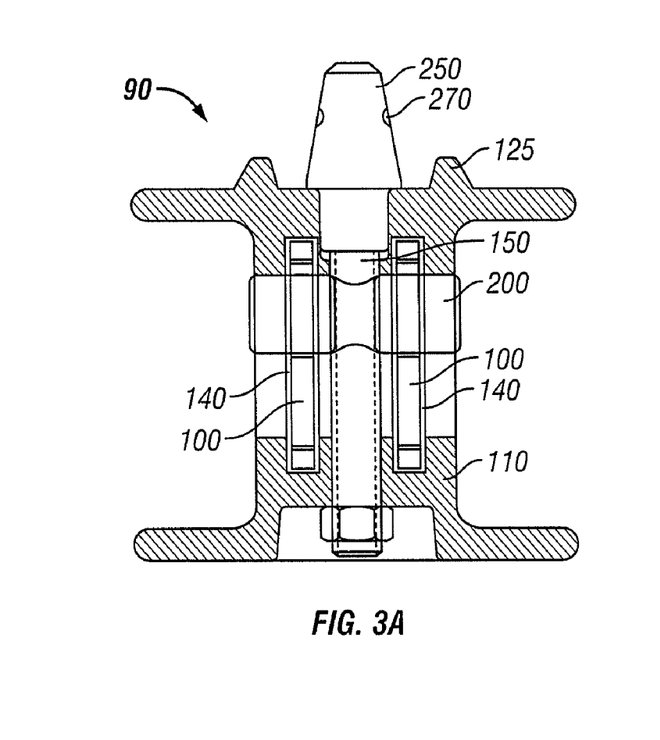
FIG. 3A is a cross-sectioned end view of the box lock of FIG. 2.
Figure 3B:
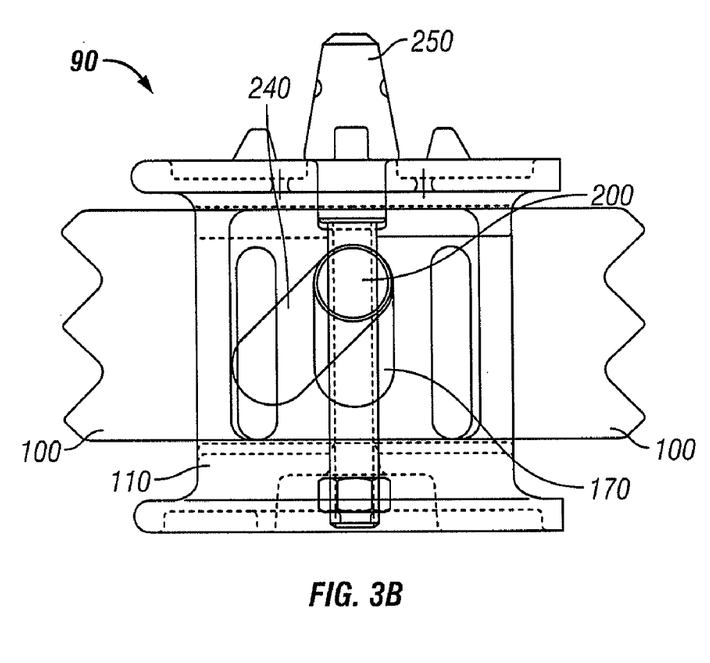
FIG. 3B is a cutaway front view of the curb box lock of FIG. 2.
Figure 8:
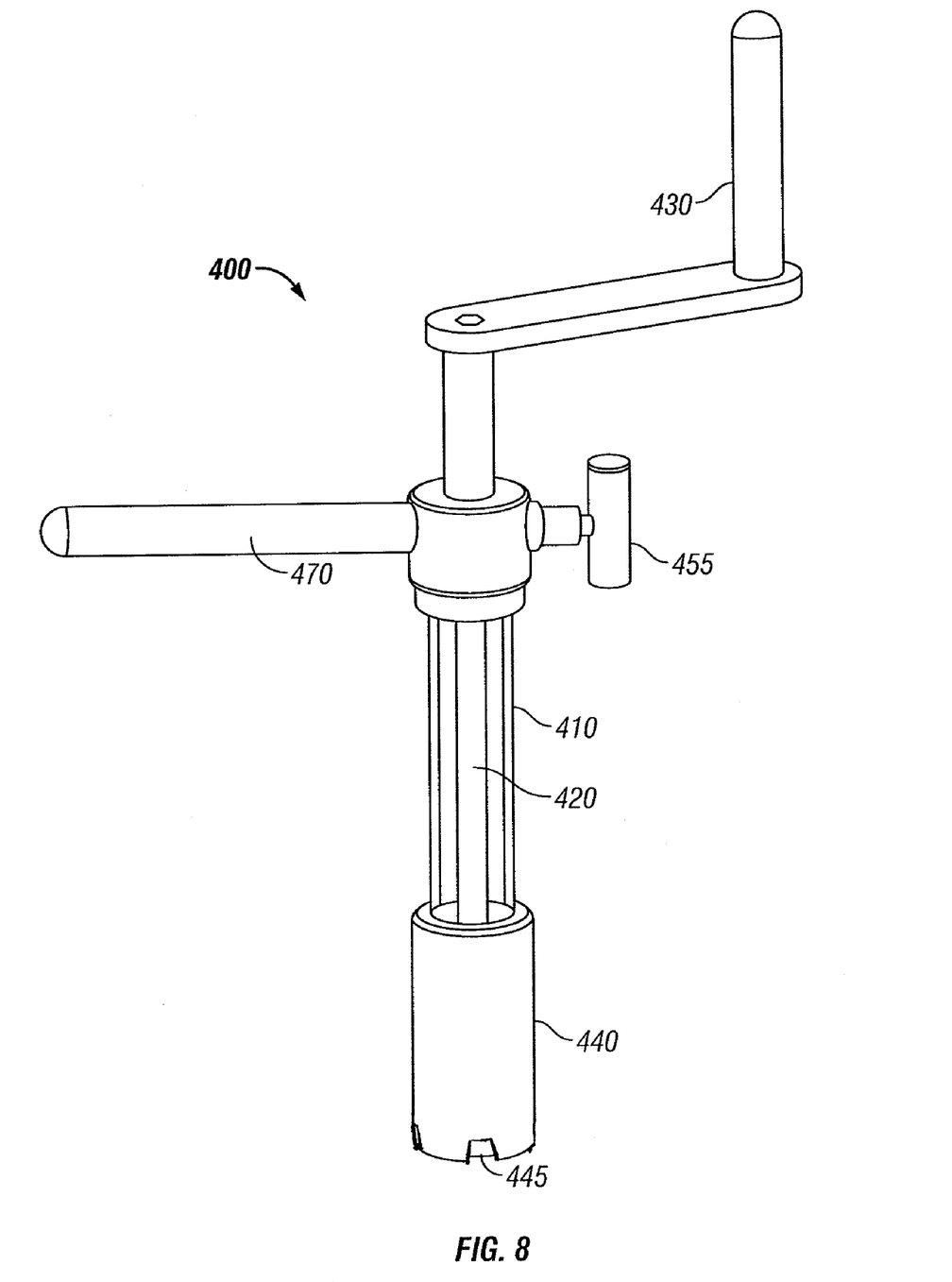
FIG. 8 is a perspective partially cutaway view of a preferred embodiment of a tool for the removal of the curb box lock of FIG. 2.
Figure 9:
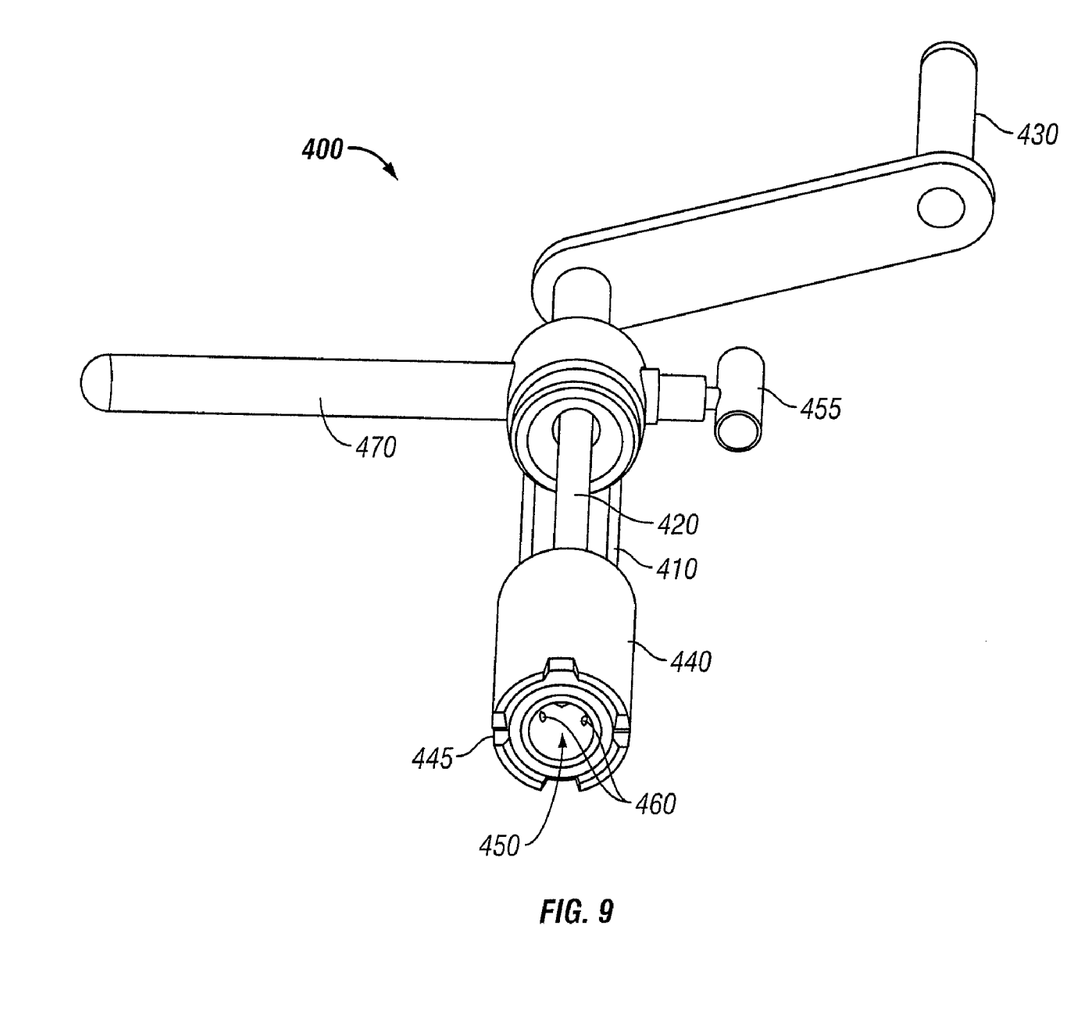
FIG. 9 is a perspective partially cutaway end view of the removal tool of FIG. 8.
Figure 10:
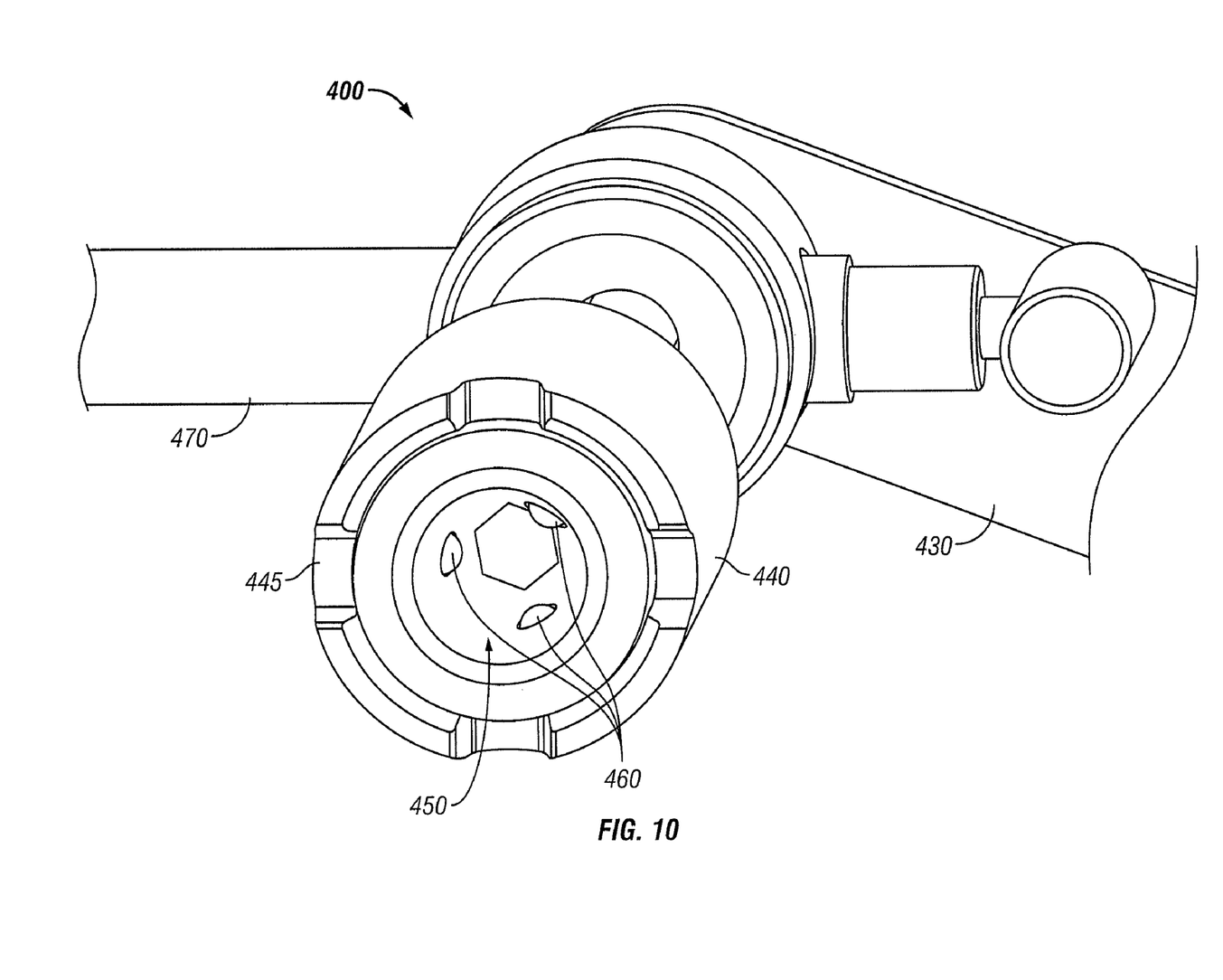
FIG. 10 is an enlarged perspective end view of the removal tool of FIG. 8.
Figure 11A:
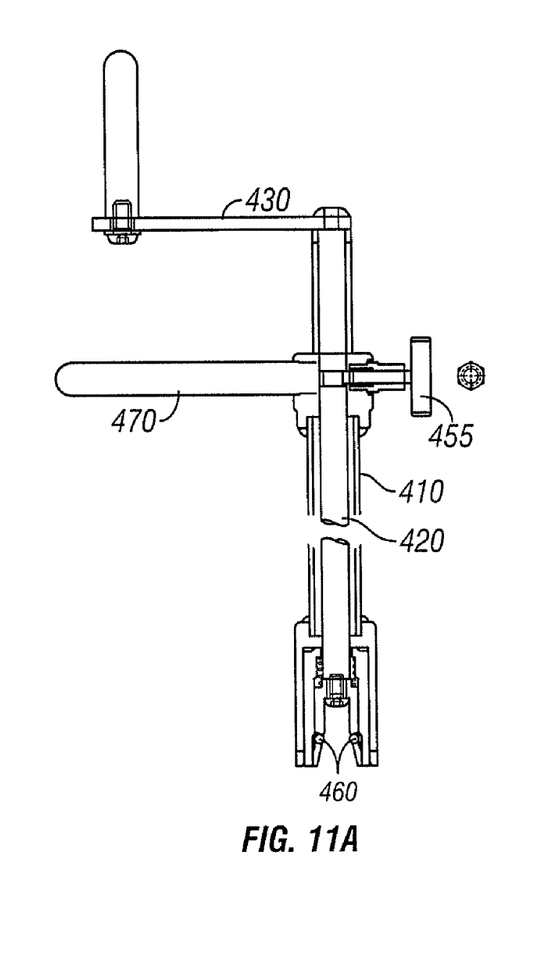
FIG. 11A is a cross-sectioned side view of the removal tool of FIG. 8.
Figure 11B:
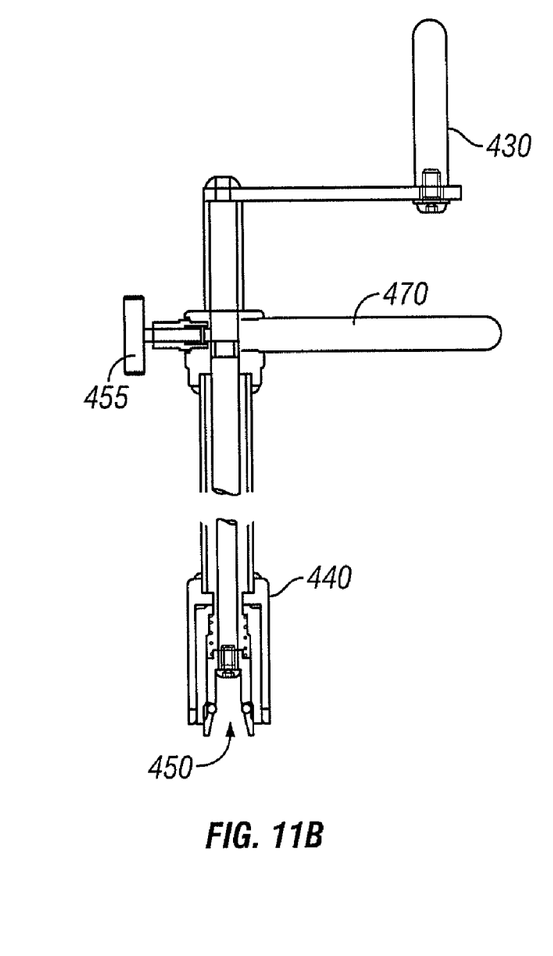
FIG. 11B is an additional cross-sectioned side view of the removal tool of FIG. 8.
Figure 12A:
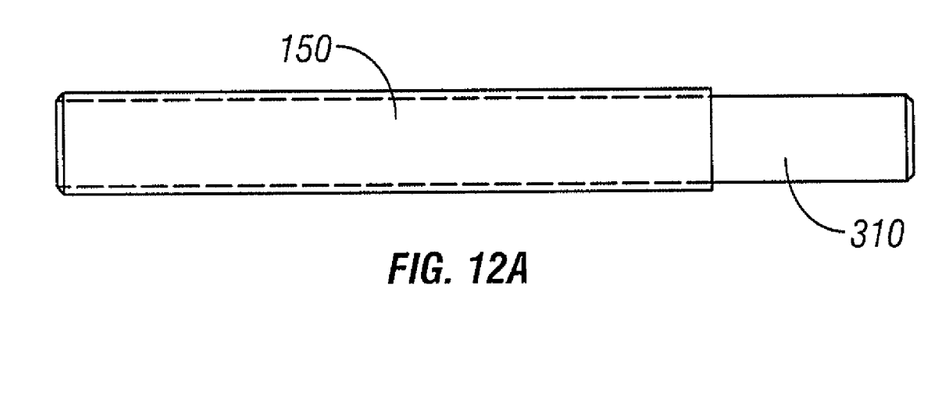
Figure 12B:
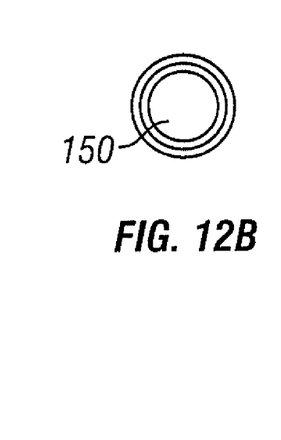
Figure 12C:
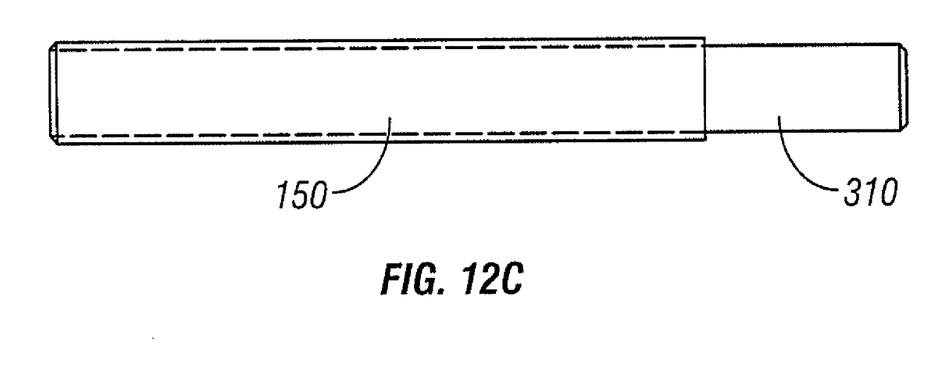
Figure 13A:
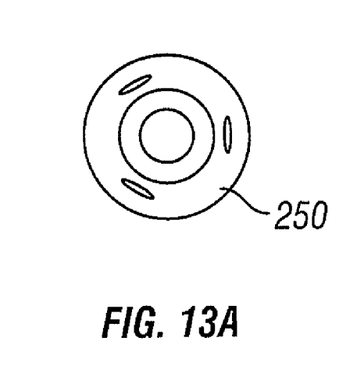
Figure 13B:
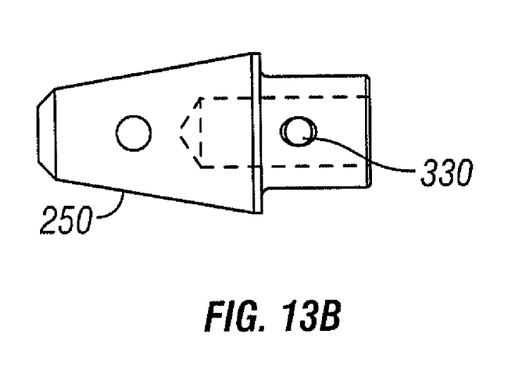
Figure 13C:
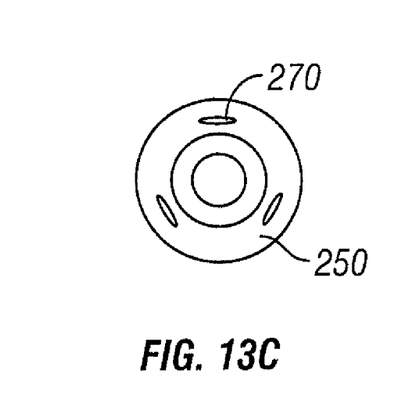
Figure 13D:
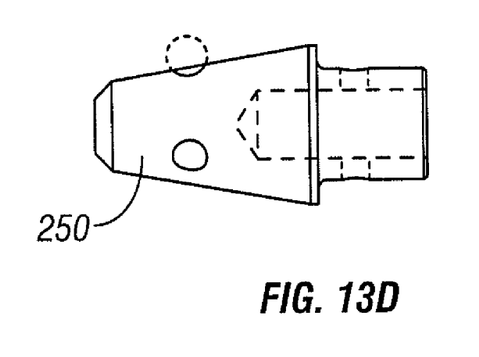
Figure 13E:
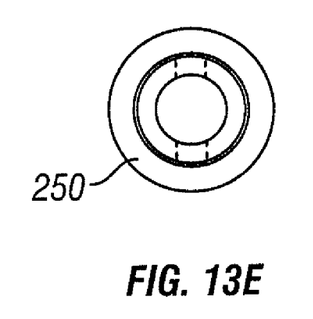
Figure 14A:
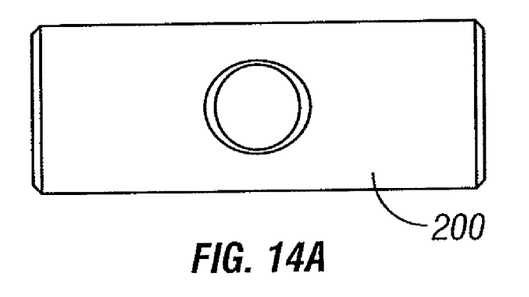
Figure 14B:
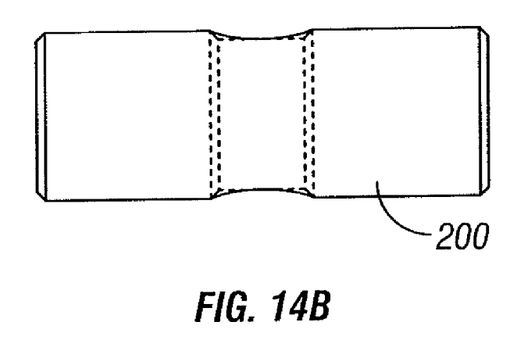
Figure 14C:
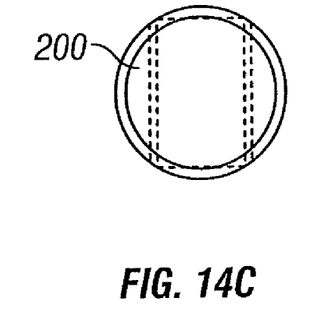
Figures 15A, 15B:
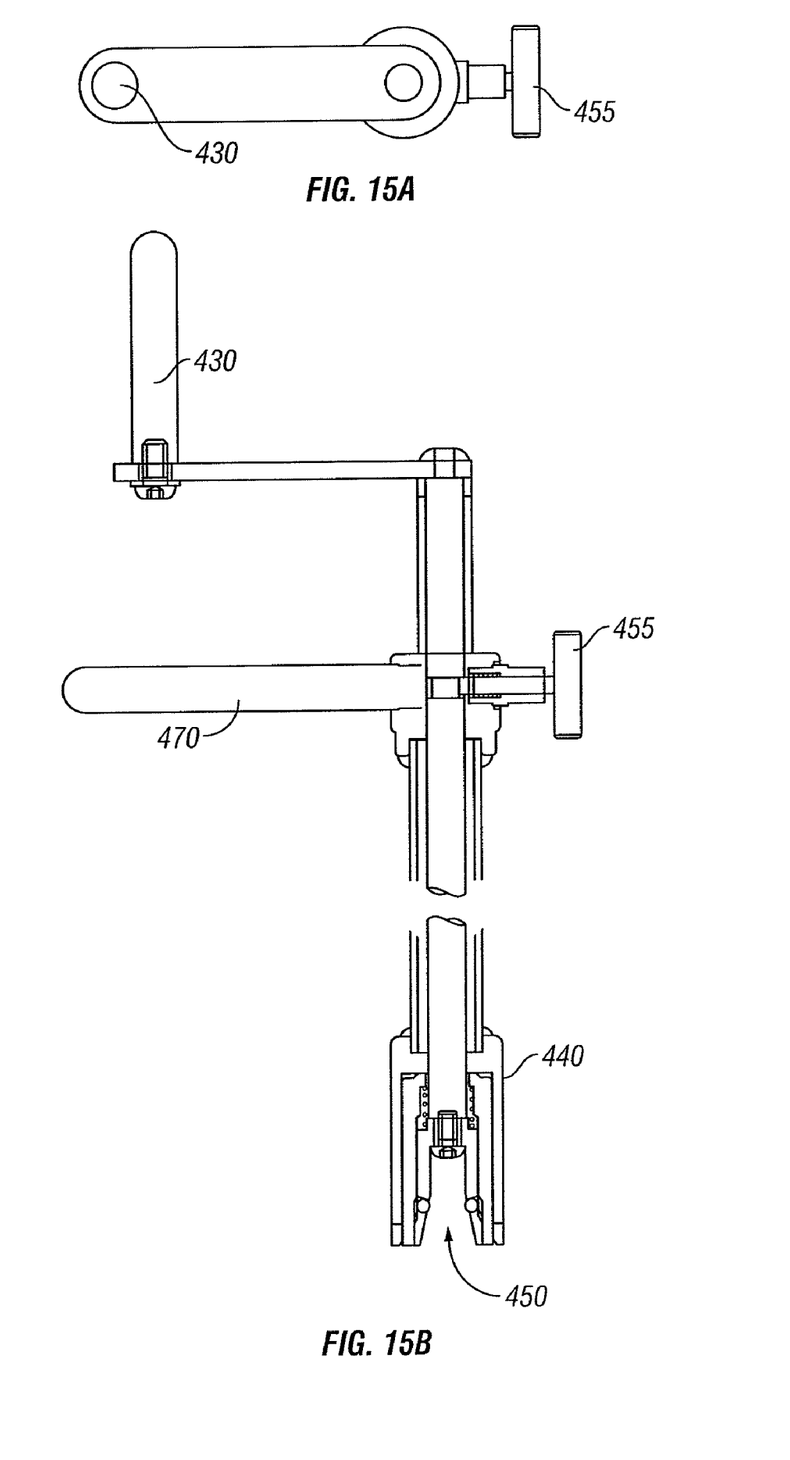

Referring now to FIGS. 2, 3A-3B, the cam shaft 200 is operatively connected to a threaded rod or screw 150 such that when the rod 150 is rotated the cam shaft 200 is raised or lowered in the cam slots 170. In a preferred embodiment, the cam shaft 200 is connected to the rod 150 through a threaded cam shaft bore (not shown) that matingly receives the threaded rod 150. At an upper end of the threaded rod 150 is a cone-shaped tip 250. The tip 250 may be secured to the threaded rod 150 through a pin 260 or, alternatively, the rod 150 and tip 250 may be unitary. The tip 250 includes a plurality of ball detents 270 which accept corresponding balls located in the specialized tool (FIG. 8). The detents 270 allow the rod 150 to be rotated via the tool. The threaded rod 150 is secured to the body portion 110 through a washer 280 and nut 290.

When the rod 150 is rotated, the cam shaft 200 is raised or lowered in the cam slots 170. The cam shaft 200 also travels in the diagonally oriented claw slots 240. When raised, the interaction of the cam shaft 200 in the diagonal claw slots 240 effectively pushes or cams the serrated end 230 of each claw 100 outward away from the body portion 110 until they contact the interior of a curb box. While the claws 100 are depicted with three serrations or teeth per end 230, any number is acceptable provided the claws 100 engage the curb box wall with sufficient strength to prevent removal.

Figure 4:
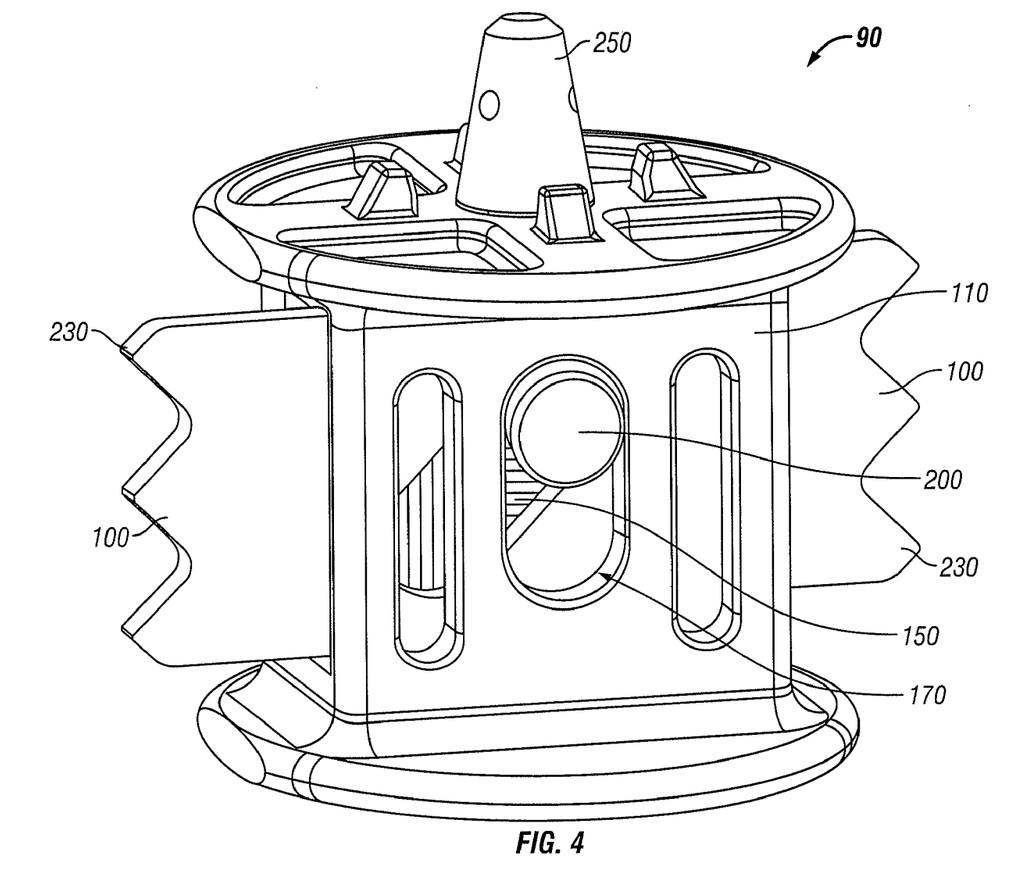
FIG. 4 is a perspective view of the curb box lock of FIG. 2 depicting an assembly lock with extended claws.
Figure 5:
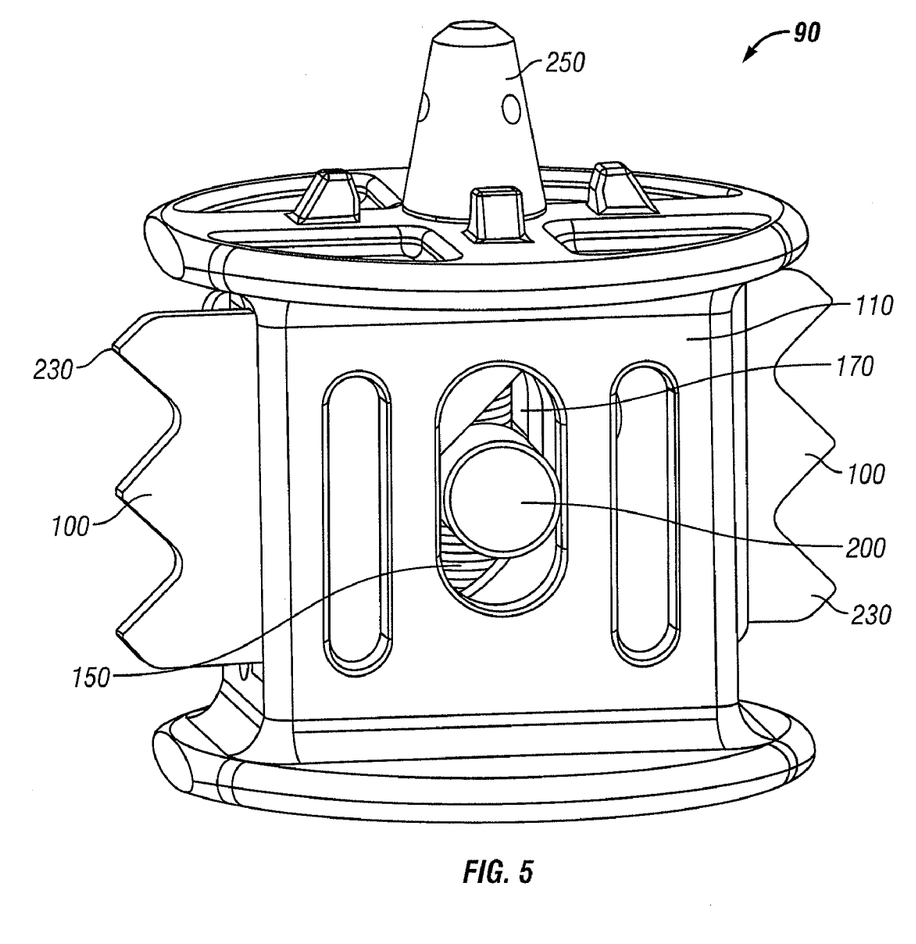
FIG. 5 is an additional perspective view of the assembled lock of FIG. 4 depicting partially retracted claws.

Turning now to FIGS. 3A-5, an assembled lock 90 is depicted. As shown, the cam shaft 200 protrudes from the cam slots 170 in the body portion 110 of the lock 90. The cam shaft 200 is substantially perpendicular to the rod 150 which in turn is substantially perpendicular to the claws 100. In FIGS. 3B and 4, the cam shaft 200 is at an upper limit or bound of the cam slot 170 and, as shown, the shaft 200 is also at an upper bound of each claw slot 240 thereby extending the claws 100 outward away from the body portion 110 of the lock 90. As shown in FIG. 5, when the rod 150 is rotated to the lower the cam shaft 200, the shaft 200 travels in the claw slots 240 camming the claws 100 inward so that the lock 90 may be removed from a curb box.

Additionally, the body portion 110 includes a series of protrusions 125 on its upper surface which prevent the body 110 from rotating along with threaded rod 150. The protrusions 125 matingly engage notches 445 in a fixed, non-rotating end portion 440 of the removal tool 400 (FIG. 8).

The orientation and interaction of the cam shaft, claws slots, and cam slots are important aspects of the present invention. These components allow the inventive lock to be placed into a curb box and secured in the box with the claws extended outward engaging the interior walls of the box. Significantly, the claws are extended with significant force regardless of whether unauthorized removal is attempted. This is not possible with known systems, which feature claws that only extend into lock box walls with substantial force when a collar is pulled upward axially away from a lock body. With relatively shallow and wide boxes, however, it may be possible in certain circumstances to remove a lock without pulling upward on the collar. The present invention addresses this possibility, which was previously not appreciated in known systems.

Figure 6A:
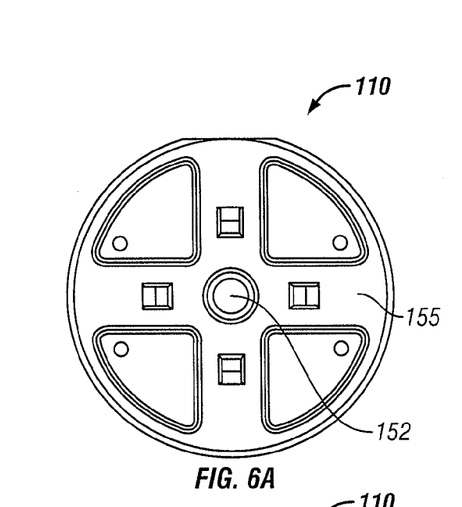
FIG. 6A is a top view of a body portion of the curb box lock of FIG. 2.
Figure 6B:
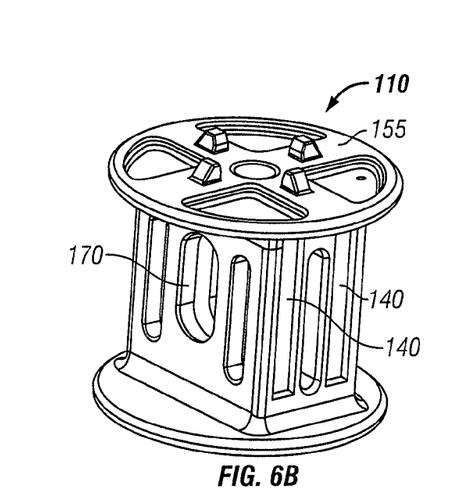
FIG. 6B is a perspective view of the body of FIG. 6A.
Figure 6C:
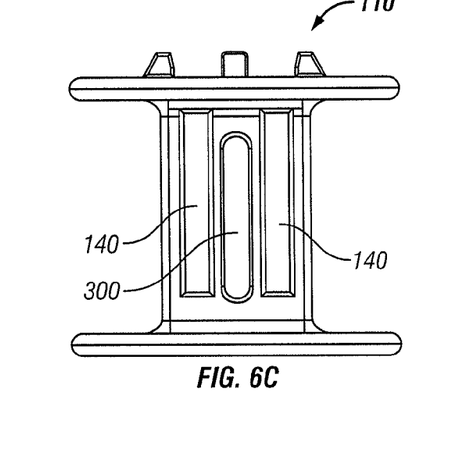
FIG. 6C is a end view of the body of FIG. 6A.
Figure 6D:
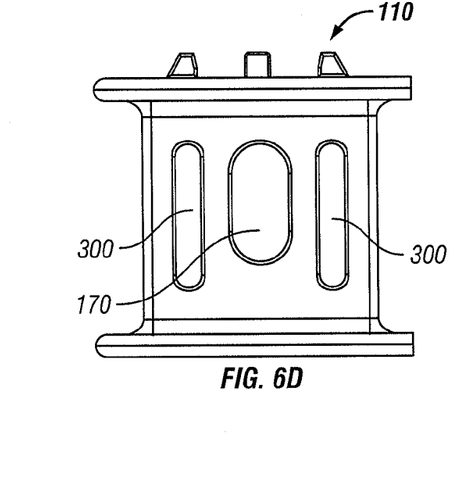
FIG. 6D is an front view of the body of FIG. 6A.

As depicted in FIGS. 6A-6B, the body portion 110 is shown in greater detail. The rectangular side openings 140 which receive the claws 100 are illustrated as well as the cam slot 170. As shown, the body portion 110 has a series of cutaway portions 300 which reduce the weight of the body 110. The body portion 110 is preferably cast from a relatively strong metal. As will be appreciated, however, other materials may be employed provided they are sufficiently durable.

Likewise, the claws 110 are preferably manufactured from a durable metal. While other types of materials may be utilized, it should be noted that the claws 110 are ideally manufactured from a fire-resistant material so they cannot simply be burned out to remove the lock 90. Moreover, the claws 110 should be sufficiently strong to resist being cut or chipped away.

Figure 7A:
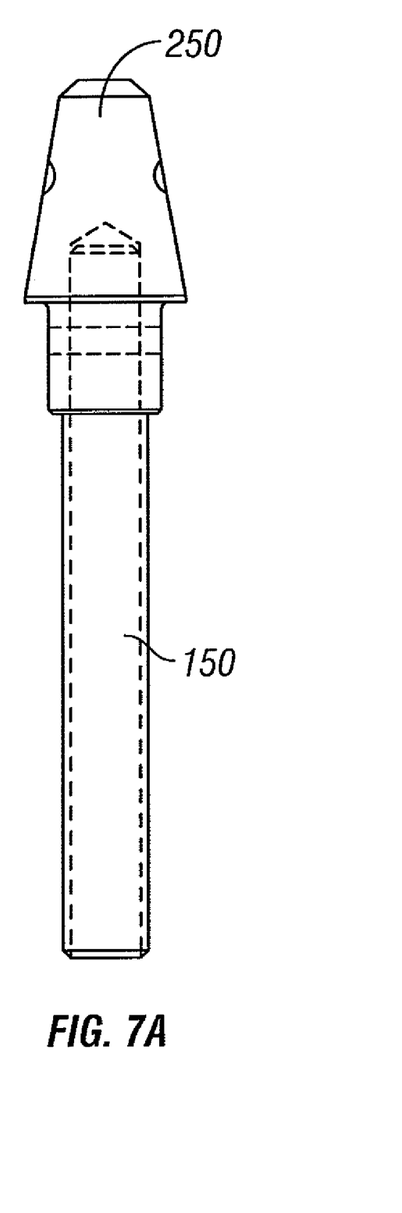
FIG. 7A is a front view of a threaded rod of the curb box lock of FIG. 2.
Figure 7B:
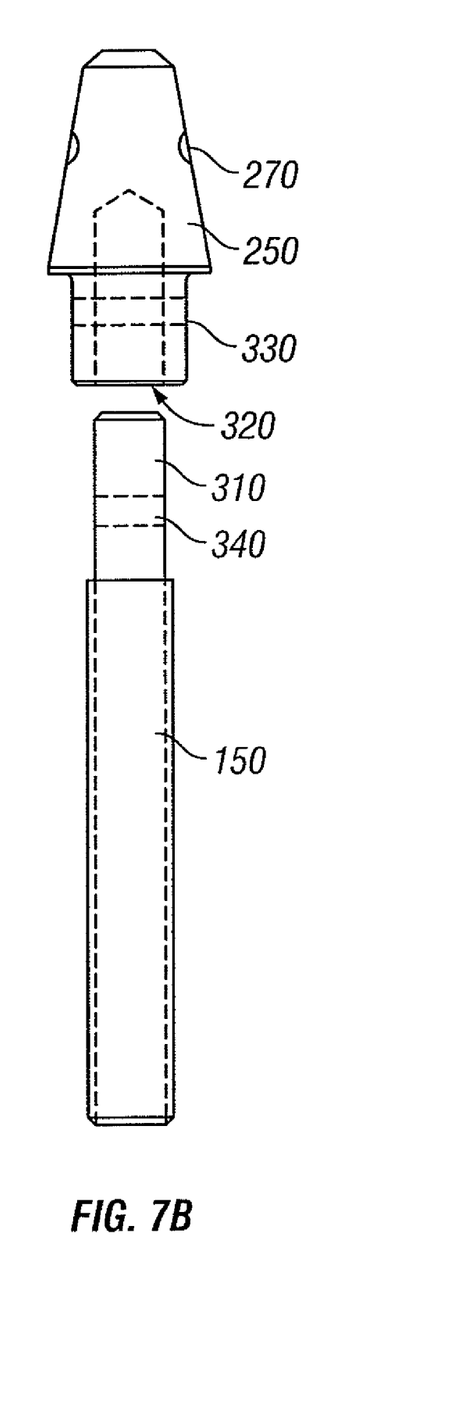
FIG. 7B is an additional front view of the threaded rod of FIG. 7A with the cone-shaped tip detached.

Referring now to FIGS. 7A and 7B, the threaded rod 150 and cone-shaped tip 250 may be unitary or the tip 250 may be secured to the rod 150 via a pin 260 (FIG. 2). If secured via a pin, the rod 150 has a portion of reduced diameter 310 which extends into a corresponding bore 320 in the cone-shaped tip 250. The pin is then inserted through an aperture 330 in the cone-shaped tip 250 and through an aligned rod aperture 340 in the reduced diameter portion 310 of the rod 150. In either configuration, the rod 150 and tip 250 are also preferably manufactured from a durable metal. In particular, the ball detents 270, should be durable enough to withstand repeated inter-engagements with the corresponding balls of the removal tool without failure.

The removal tool 400 is shown in FIGS. 8-11B. The removal tool 400 includes an outer tube 410 within which resides a crank shaft 420. One end of the crank shaft 420 is operatively connected to a handle 430. An opposite end of the crankshaft 420 is connected to a rotatable interior 450 contained within a fixed end portion 440. The handle may be rotated which causes the interior 450 of the end portion 440 to rotate. The interior 450 of the end portion 440 is sized and shaped to accommodate the cone-shaped tip 250. Moreover, the interior 450 contains several balls 460, which fit into the corresponding ball detents 270 on the cone-shaped tip 250 to install and remove the inventive lock. The fixed end portion 440 also contains a plurality of notches 445. The notches 445 receive protrusions 125 on the surface of the lock body 110 so that the body 110 does not rotate with the rod 150.

The balls of the end portion 440 may be selectively extended and retracted to engage the ball detents. When the balls 450 engage the detents, the lock may be placed into a curb box or lifted out of a box. Moreover, when engaged, the cone-shaped tip 250 may be rotated via the handle 430 to extend the claws 100 so that they contact an interior of the box to prevent removal.

The removal tool 400 also includes a biased locking means 455 which can fix the tool 400 in a position where the balls are deployed allowing a lock to be secured to the tool 400 so that it may be easily lowered into or raised from a lock box. The tool 400 further includes a grab handle 470 to facilitate the installation and removal of such locks.

FIGS. 12A-15 show detailed plan views of the various subcomponents of the inventive lock and removal tool.

In sum, the inventive lock has fewer components than known locks allowing for an ease of manufacture and reduction in associated costs. The inventive lock also provides the additional security of slidably extendable jaws that are permanently deployed while the lock is in use in a curb box. This additional security measure is important for lock boxes having a relatively shallow depth and large diameter.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A curb box lock, said lock comprising:
    a body portion having an upper collar at an upper end of said body portion and a lower collar at a lower end of said body portion, said upper end opposite said lower end, said body portion also having a bore extending from said upper end to said lower end of said body portion;
    a plurality of slidably extendable claws within said body portion; said claws being linearly extendable from said body portion to selectively engage side walls of a curb box;
    a threaded rod, said rod extending through said bore; and
    wherein said threaded rod is operatively connected to said slidably extendable claws such that when said rod is rotated said claws extend linearly outward away from said body portion to engage side walls of said curb box such that said claws can be maintained in forceable engagement with said side walls at all times when said lock is deployed within a curb box to prevent removal of said lock.

2. The curb box lock of claim 1, wherein said lock further comprises:
    a cam shaft operatively connected to said threaded rod such that said cam shaft moves in a direction from said lower end of said body portion to said upper end when said threaded rod is rotated; and
    wherein said movement of said cam shaft urges said extendable claws linearly outward to engage side walls of said curb box.

3. The curb box lock of claim 2 wherein said cam shaft engages diagonally extending slots in said claws such that movement of said shaft from said lower end to said upper end cams said claws linearly outward to engage side walls of said curb box.

4. The curb box lock of claim 1 wherein said lock further comprises:
    an engagement portion at said upper end of said body portion, said engagement portion being operatively connected to said threaded rod such that rotation of said engagement portion rotates said threaded rod, and
    wherein said engagement portion allows for the attachment of a tool capable of rotating said engagement portion and threaded rod.

5. The curb box lock of claim 4 wherein said engagement portion is a cone-shaped tip, said tip including ball detents which accept corresponding balls of a tool capable of rotating said engagement portion and threaded rod.

6. The curb box lock of claim 4 wherein said upper portion of said body portion includes at least one protrusion, said protrusion engaging a non-rotating portion of a tool to prevent said body portion from being rotated while said engagement portion and threaded rod are rotated.

7. A lock for securing a substantially tubular curb box containing a utility valve to thwart access to said valve, said lock comprising:
    a body portion, said body portion having an upper collar at an upper end of said body portion and a lower collar at a lower end of said body portion, said upper end opposite said lower end, said collars closely fitting said curb box to prevent access to said utility valve, said body portion having a bore extending from said upper end to said lower end of said body portion;

a plurality of slidably extendable claws within said body portion; said claws being extendable linearly from said body portion to selectively engage side walls of a curb box;

a threaded rod, said rod extending through said bore; said threaded rod is operatively connected to said slidably extendable claws such that when said rod is rotated said claws extend linearly outward away from said body portion to engage side walls of said curb box;

an adjustment mechanism operatively connected to said threaded rod; and wherein said adjustment mechanism selectively, linearly and fixedly extends said claws such that said claws can be maintained in forceable engagement with said side walls at all times when said lock is deployed within a curb box to prevent removal of said lock.

8. The lock of claim 7, wherein said adjustment mechanism comprises:

a cam shaft operatively connected to said threaded rod such that said cam shaft moves in a direction from said lower end of said body portion to said upper end when said threaded rod is rotated in a first direction and from said upper end to said lower end when rotated in a second direction; and wherein said movement of said cam shaft when said threaded rod is rotated in said first direction urges said extendable claws linearly outward to engage side walls of said curb box, and rotation of said rod in said second direction retracts said claws such that said lock may be removed from said curb box.

9. The lock of claim 8 wherein said cam shaft engages diagonally extending slots in said claws such that movement of said shaft from said lower end to said upper end cams said claws linearly outward to engage side walls of said curb box.

10. The lock of claim 9 wherein said adjustment mechanism comprises:

a cone shaped tip at said upper portion of said body portion, said tip being operatively connected to said threaded rod such that rotation of said tip rotates said threaded rod, and wherein said tip includes ball detents which accept corresponding balls of a tool capable of rotating said engagement portion and threaded rod.

11. The lock of claim 10 wherein said upper portion of said body portion includes at least one protrusion, said protrusion engaging a non-rotating portion of a tool to prevent said body portion from being rotated while said tip and threaded rod are rotated.

* * * * *